Aug. 24, 1954  O. F. REITER  2,686,996
STONEPICKER
Filed Jan. 8, 1951  5 Sheets-Sheet 1

INVENTOR.
Otis F. Reiter
BY Johnson and Kline
ATTORNEYS

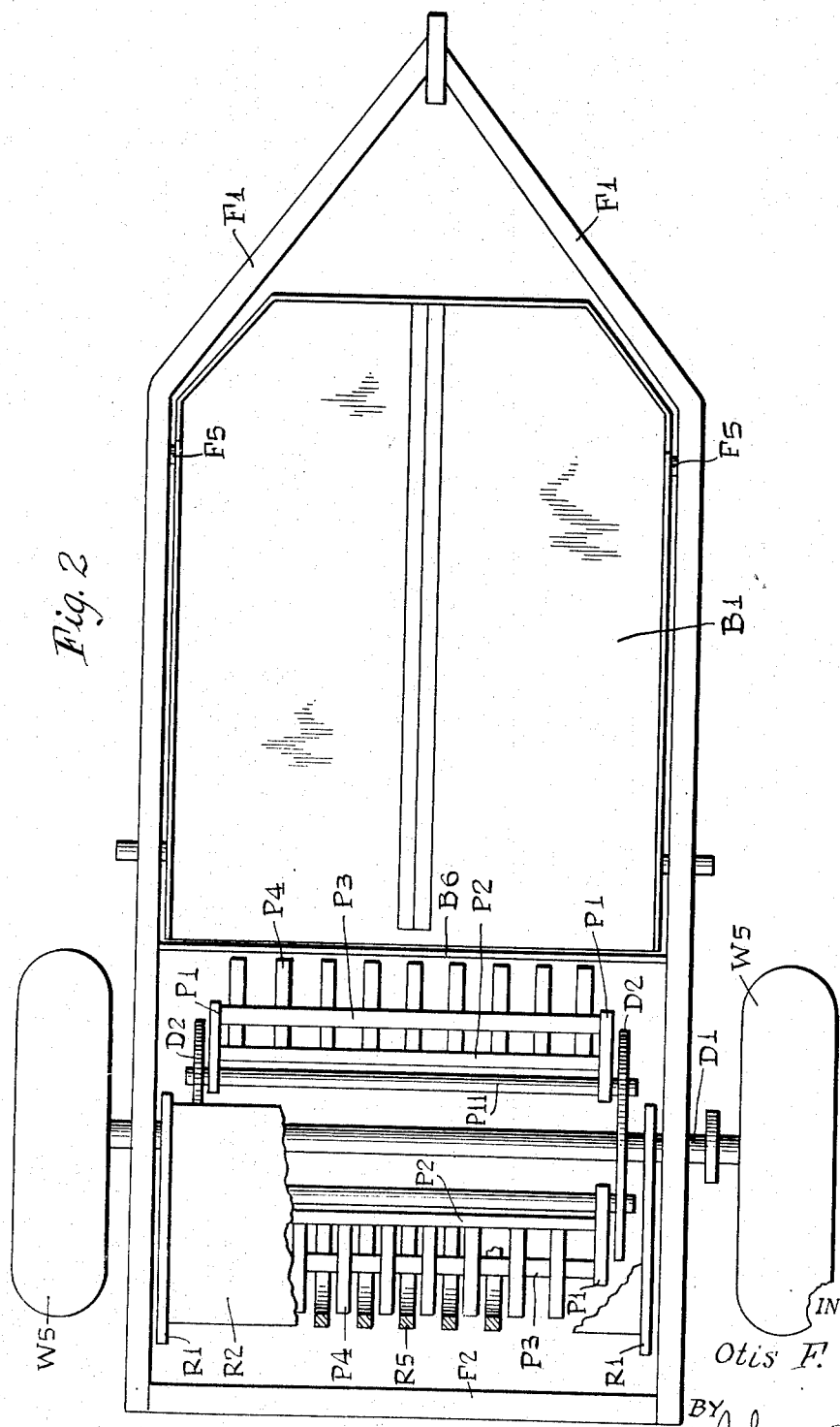

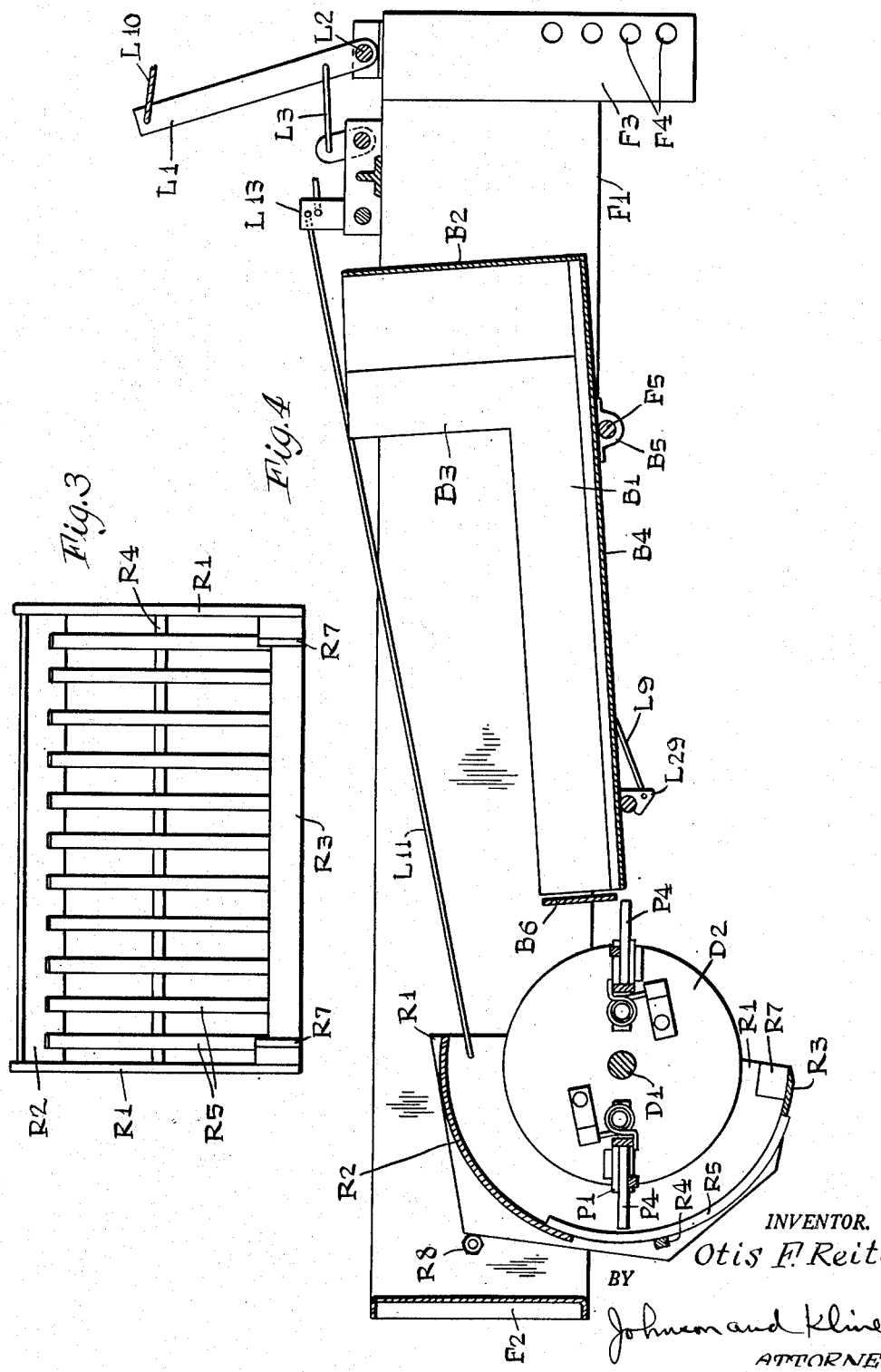

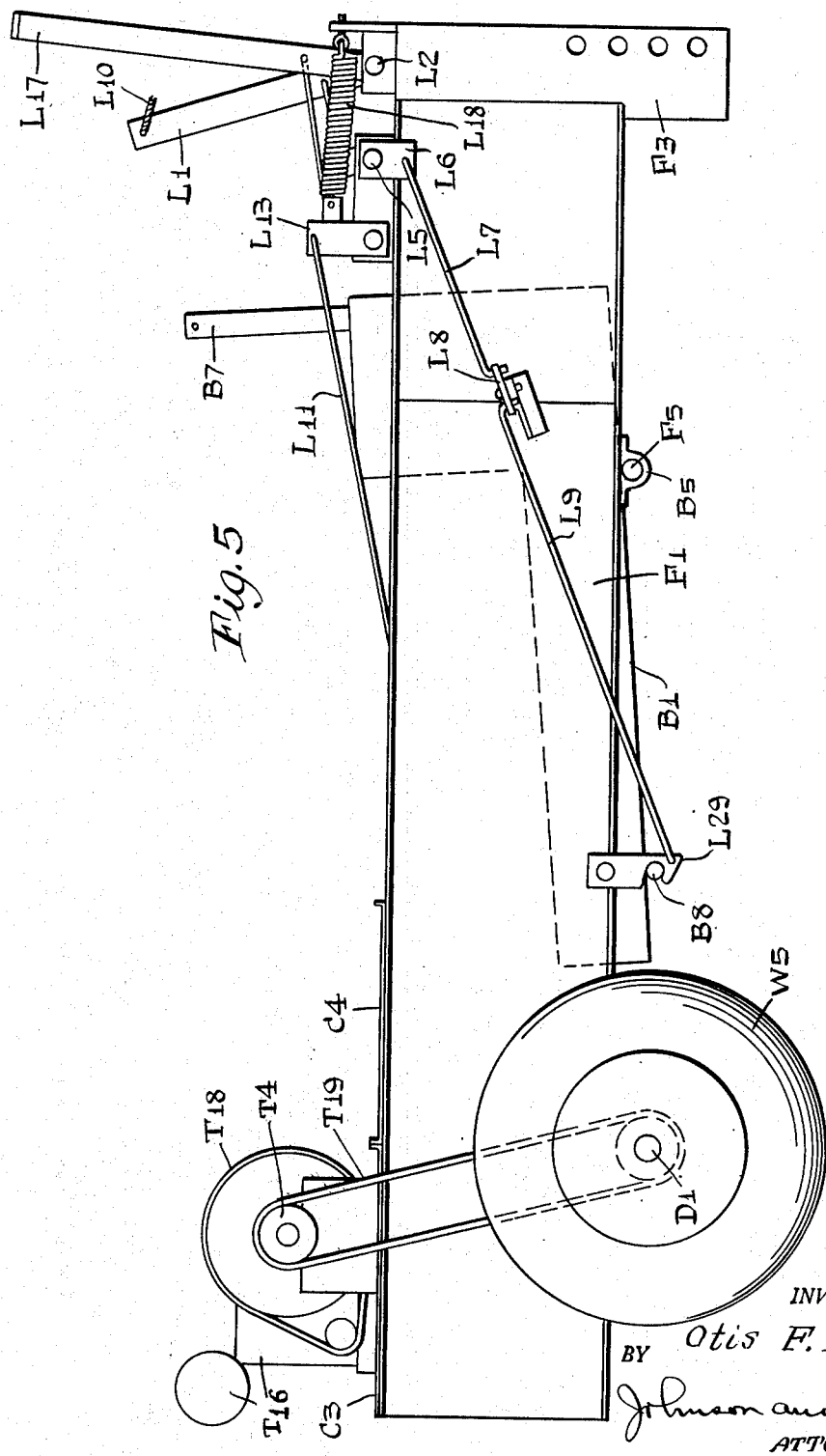

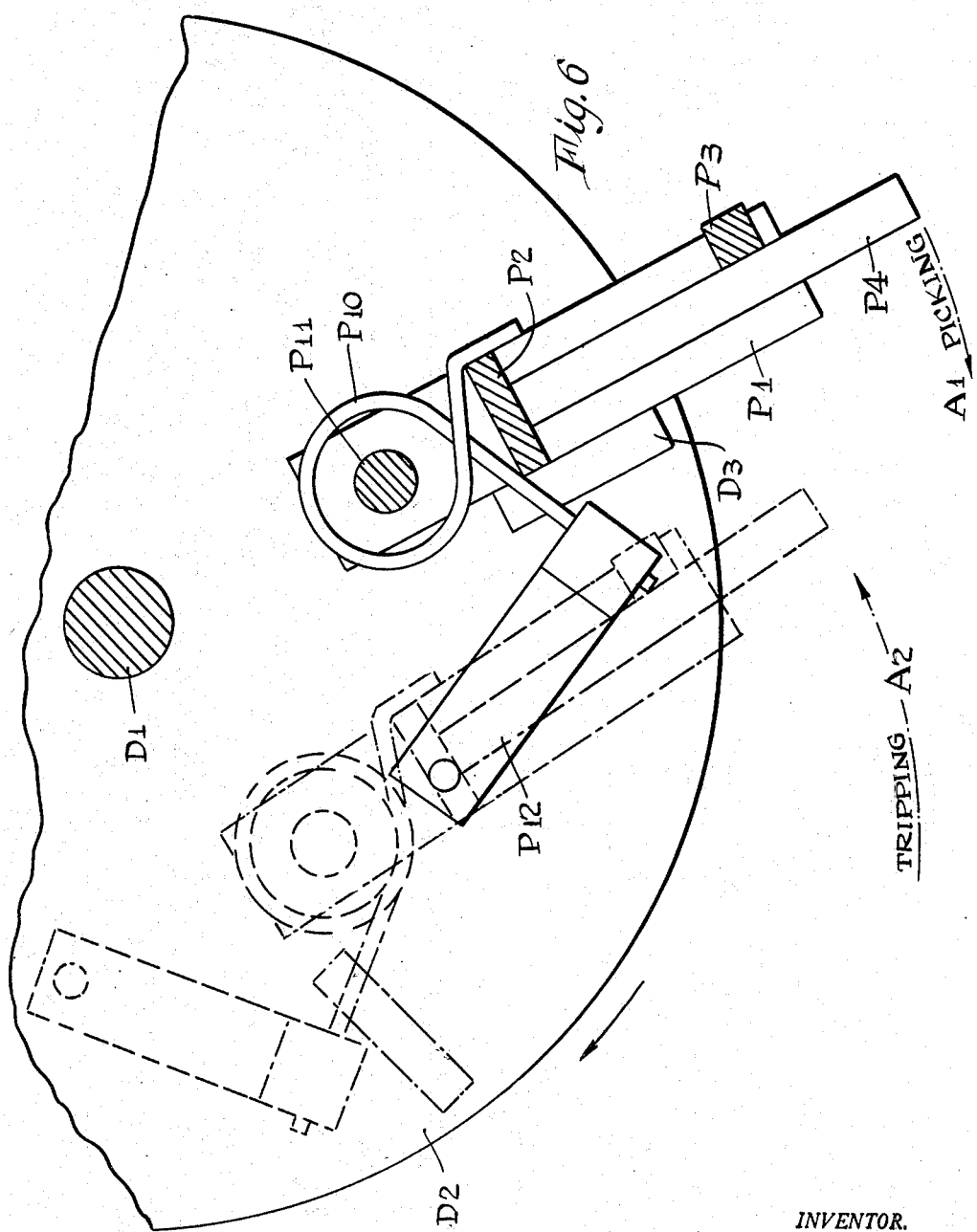

Patented Aug. 24, 1954

2,686,996

UNITED STATES PATENT OFFICE 2,686,996

STONEPICKER

Otis F. Reiter, Bridgeport, Conn.

Application January 8, 1951, Serial No. 204,914

5 Claims. (Cl. 55—17)

This invention relates to stone pickers and aims generally to improve the same.

Particular objects of the invention, severally and interdependently, are to provide a stone picker of simplified and economical construction; one in which the picking operation may be independent of the speed at which the machine is drawn over the ground; one adapted for operation as a trailer behind any suitable farm tractor or horse-drawn vehicle; one having an improved arrangement for clearing the rake-bars of dirt, trash and small stones that become lodged therein; one relieving the picking arms of cumulative burden; and one having an improved arrangement for freeing the picker drive when obstructions are encountered; while other objects are to provide subsidiary improvements contributing to the attaining of the principal objects. The invention resides in the stone picker and in the new and useful combinations and elements incorporated therein, as hereinafter exemplified and claimed.

In the accompanying drawings of an exemplary embodiment of stone picker incorporating the invention:

Fig. 2 is a plan view with certain parts removed.

Fig. 3 is a detail in front view of the picker rake.

Fig. 4 is a longitudinal section.

Fig. 5 is side elevation.

Fig. 6 is a detail on an enlarged scale, showing the mounting and action of the picker teeth.

Figure 1:
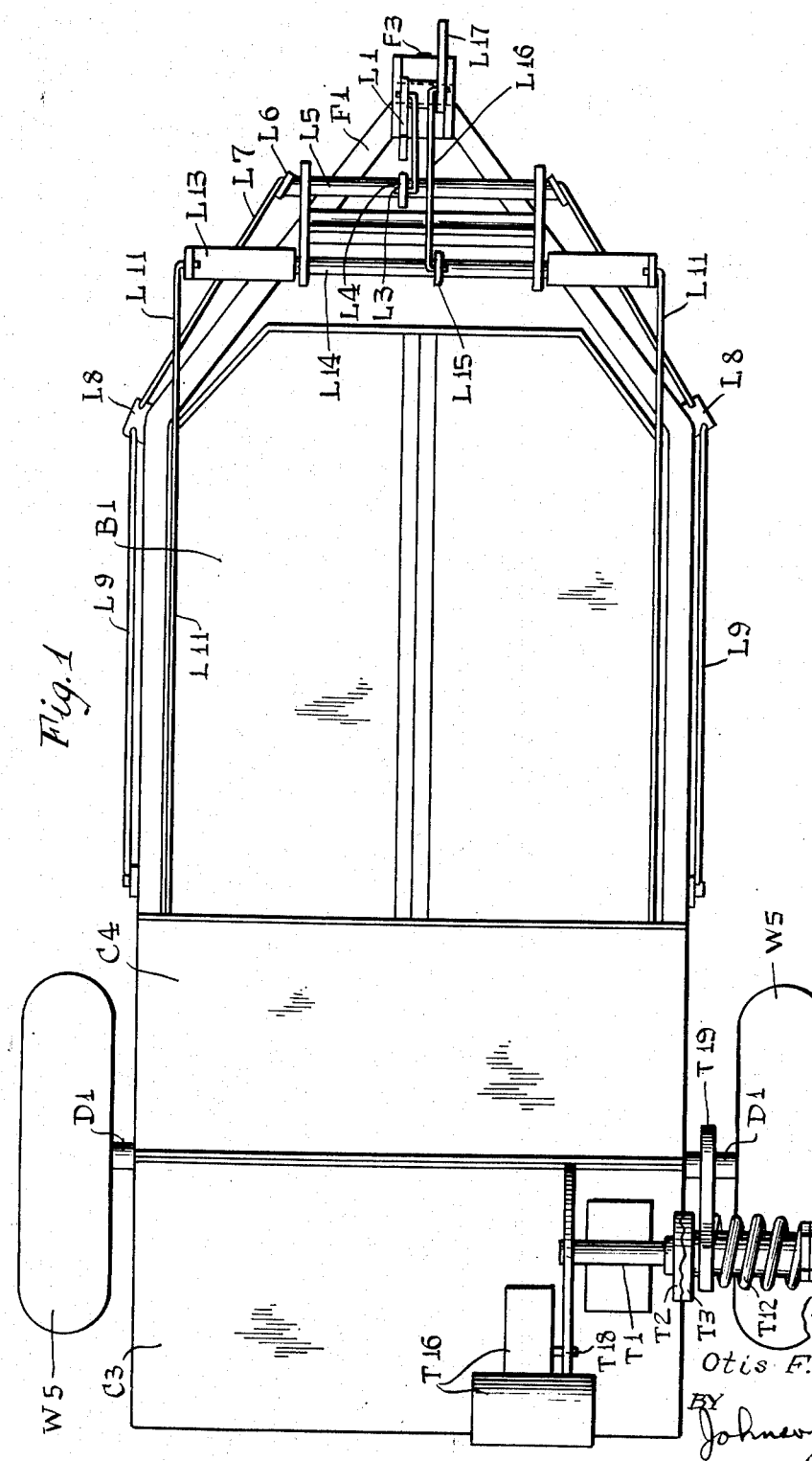
Fig. 1 is a plan view.

In the form shown in the drawings which will now be described to exemplify the invention, the picker comprises stone box elements B, cover elements C, picker arm supporting elements D, a frame F, operating levers L, picker elements P, rake elements R, drive elements T and supporting wheel elements W, of which, for simplicity, the parts are designated in the drawings and in this description by numerical modifications of these same letters.

Chassis

As best shown in Figs. 1, 2, 4 and 5 the frame F is made up of side channel members F1, a rear channel member F2 and a front-end tractor plate F3, all suitably secured together as by welding, for example. The front tractor member F3, as shown in Fig. 4, is provided with a series of holes F4 to enable it to be secured to a tractor or other towing device. The frame F1 in the illustrative embodiment pivotally supports the stone box B, as shown at F5 in Figs. 2 and 4, and also supports the rear wall of the stone box B6. The frame F is mounted on the axle D1 which is journalled to rotate in the frame and carries the picking unit discs or side plates D2 by which the picker arms are supported. Wheels W5, preferably rubber tired, are rotatably mounted on the axle D1.

Stone box and latch

The stone box B comprises a tiltable dump body B1, having a front wall B2, side walls B3, and a bottom B4. This body is provided with journals B5 by which it is pivoted to the frame-carried shaft or pivot means F5. In the preferred form shown, the box bottom B4 is normally rearwardly inclined so that the weight of the stones concentrates at its rear portion, to tilt it downwardly and rearwardly to discharge the load when the box latch means L29 is released. The box may be returned to latched position by pulling on a rope connected to box closing handle or lever B7 (Fig. 5) or may itself be balanced on the pivots F5 so that when unloaded it normally will swing back to the position shown in Fig. 4. A rear wall for the stone-box B6, as above noted, is fixed to frame members F1 and lies just rearwardly of the box providing a small clearance between them. The side walls B3 of the stone box, in the form shown are L-shaped. This increases the weight at the head end of the box, economizes on material, and utilizes the frame channels F1 to laterally confine the load when it extends above the lower portions of the walls B3.

As is best shown in Fig. 5, the box B1 is provided with latch bar means B8 which may be welded or otherwise secured to its bottom, and which is engaged by latch hooks L29 pivotally mounted on the frame F1. Latch operating lever L1 is pivotally mounted at L2 and connected to latch hooks L29 by link, crank, shaft lever, and link means L3-L7, bell-cranks L8 carried by frame channels F1 and links L9. In the form shown the weight of the linkage system holds the latches L29 in engagement until released by pull on a suitable control cord L10 connected to lever L1.

Rake or stone guide

The rake or stone guide R, as shown in Figs. 2 to 4 comprises side plates R1; an arcuate top plate R2, a bottom edge rake blade R3 and an intermediate supporting bar R4 secured therebetween; and mutually spaced arcuate rake bars R5 bridging the space between the blade R3 and the top R2, and attached, as by welding or otherwise, to these members. The rake blade R3 is preferably bevelled at its lower edge as shown in Fig. 4, and is provided at each of its ends with rake guards R7 in the form of inwardly inclined metal plates for preventing stones and litter from becoming caught between the picker elements and the side plates R1 of the rake. Side plates R1, as shown in Fig. 2, are journalled on shaft D1, and suitable, fixed or adjustable stops, exemplified at R8, Fig. 4, may be provided to position the rake during the picking operation.

While the rake or stone guide R of this invention is a rake in the sense that it separates the stones from loose dirt, still in the present machine it will be noted that the lower edge of the rake is preferably a continuous bar R3, so that the rake structure does not itself rake or pick the stones and really serves principally to receive material driven into it by the picker teeth, as hereinafter described, to act as a strainer by letting the dirt pass through between the bars R5, and to confine the stones to an arcuate path and deliver them to the stone box. This operation is made possible in the present machine by the new mode of operation of the picker teeth, hereinafter described.

The rake assembly for transport and during dumping of gathered stones, is raised arcuately about the axle D1 as a center by suitable means, such as link means L11 connecting the side plates R1 with a lever system, best shown in Fig. 1, and comprising lever, shaft, crank, link and lever elements L13 to L17, the latter being pivoted at L2 in the form shown.

Fixed or adjustable balancing spring means L18 as shown in Fig. 5, may be connected in the rake control system. When connected to exert pull in a direction to lift the rake, as shown, the spring means renders the rake assembly R more readily displaceable about the axle D1 under impact of the rake blade R3 against any obstruction, and assists the operator in lifting the rake for transportation or dumping of a load.

Picker mechanism

As is shown in Figs. 2, 3 and 6, the picker mechanism is supported between the supporting discs or plates D2 which are fixed to shaft or axle D1, and comprises picker bars P1 arranged in pairs and carrying inner cross bars P2 and outer support bars P3. Mutually spaced picker teeth P4 and P4a are welded or otherwise mounted on the picker cross-bars P2 and extend therefrom outwardly past the teeth supporting bars P3, which are placed rearwardly thereof, viewed in the direction of picking rotation shown by arrow A1, Fig. 6. In the preferred form shown, two sets of picker tooth assemblies P1—P4 and P1—P4a are employed, and these are pivoted on diametrically opposed picker arm shafts P11 and normally extend substantially radially in opposite directions as shown in Fig. 4, being held in these positions, in which the front faces of the bars P1—P2 abut stop elements D3 carried by the discs D2, by means of tensioning springs P10 also carried by the discs D2. In the form shown the springs P10 are loop-type torsion springs, hooked at one end over the bars P2, looping around the picker arm shafts P11 and having their other ends secured in anchor blocks or spring supports P12. By this assembly the picker teeth P4 are yieldingly supported against the stops D3 during the picking operation, in the position shown in solid lines in Fig. 6, and are rendered capable of tripping or swinging backwardly and inwardly, as shown in dotted lines in Fig. 6, when obstructions are encountered.

As shown in Fig. 2, the picker teeth P4 on one picker bar assembly are aligned with the spaces between the rake bars R5, and the picker teeth P4a on the other picker bar assembly are aligned with the stone guiding faces of the rake bars R5 and just clear the same. By this arrangement the teeth P4a keep the rake-bars free of dirt while the teeth P4 clear the spaces between the rake bars of dirt, trash and small stones that may become lodged therein, as has not been possible with previous stone pickers employing conveyor bars.

Picker unit drive

The present machine, as shown in Figs. 1 and 5 obtains a new mode of operation by driving the picker mechanism independently of the movement of the picker over the ground. This is accomplished by providing the picking mechanism with its own independent unit. This driving unit, in the form shown, comprises a drive shaft T1, to which is secured by welding or otherwise one element of an overload releasing clutch element T2. The companion clutch member T3 is welded or otherwise secured to a sprocket T4, loose on the shaft T1, and is held in engagement with the element T2 by a compression spring T12 tensioned by adjusting nuts T13 engaged on the end of the shaft T1, which is threaded to receive them. The clutch elements T2 and T3 are provided with interengaging bevel-toothed faces, as shown, and on the occurrence of an overload the teeth of the movable element ride up on the teeth of the fixed element and compress the spring T12, finally slipping from tooth to tooth if the overload is sufficiently high. An internal combustion engine or like prime mover T16 is mounted on the frame, herein by bolting it to a rear cover plate C3 secured to the frame, and is connected to the picker reel drive shaft T1 by a chain and sprocket drive T18. The clutch driven sprocket T4 is the driving element of a second chain and sprocket drive T19 which rotates the main-shaft or axle D1 in the wheel bearings and frame and rake assembly journals, thus rotating the picker supporting disc D2, welded or otherwise secured to the shaft, and the picker assemblies carried thereby as shown in Figs. 1 and 5. The rear cover member C3, which supports the engine T16 in the form shown, preferably terminates in a flanged edge approximately above the shaft or axle D1, and a separate front cover member C4 is preferably provided, shown as having flanged edges to strengthen it, which extends therefrom to a position overlying at least the rear portion of the stone box.

Operation

In the operation of the picker described the operator hauls the picker to the sites to be cleared of surface stones. If hauled on its own wheels behind a tractor vehicle, the rake element is raised, the stone box is latched up, and the picker reel is preferably placed with its tooth assemblies approximately horizontal, as shown in Fig. 4, during such transportation. When the site is reached, the rake is lowered so that its blade R3 may drag along the ground, and the picker motor T16 is started. The picker is then drawn forwardly over the ground at any reasonable speed, and if necessary, the speed of the motor T16 is adjusted to discharge picked stones well forwardly into the stone box, but so as not to cause them to jump out of the picker. With the speeds so adjusted the rake or stone guide dragging on the ground behind the picker reel or stone impeller assembly, catches and guides the path of stones that are thrown into it by the picking arms or teeth. Stones striking the curved bars of the rake follow the contour until free of the curved top plate R2, which, as shown in Fig. 4, preferably extends beyond top center so as to discharge the stones forwardly and slightly downwardly. This throws the stones along more or less a straight line trajectory to the front of the box, from which they shake down toward the rear of the box. Only the heavier stones ride on the picking arms or teeth. The lighter ones are well ahead of the picking arms. Apparently the force of the picking arms striking them while on the ground, due to the fact that the picking teeth of this machine ordinarily rotate at a peripheral rate greater than the rate of forward movement of the towing vehicle, is sufficient to throw them clear around the interior surface of the stone guide and into the box.

With the arrangement shown, if the rake blade R3 engages an obstruction on the ground, it will usually itself swing up sufficiently to clear the obstruction. If the picker arms engage an obstruction they yield to it without damage. The clutch arrangement is simple and effective and avoids the use of splines and keyways which are expensive and troublesome. When an obstruction gets caught in the picking unit and causes it to stop, the driving unit T2 continues to rotate and pushes the driven unit T3 away from it. This is possible because of the lateral flexibility of the chain drive T19. If the picking unit frees itself, as usually happens with this machine, the clutch reengages and continues to revolve the picking unit.

When a sufficient load of stones has been accumulated in the box, the operator draws the picker to the point where they are to be dumped, raises the rake, and operates the lever L1 to release the box latching means L29. The rear of the tilting box then drops and spreads the stones under the picker mechanism. Except where large stones or heavy loads are being dumped, the picker arms may continue to rotate during this operation, although it is advantageous to stop their rotation and position them about horizontally to avoid unnecessary wear and strain.

While a preferred embodiment of the invention has been described to exemplify the same, this embodiment is to be taken as illustrative and not restrictive of the invention, which is defined in the following claims.

I claim:

1. A stone picker comprising a frame having a forward and rear end and wheels movable over the ground, a high-speed stone impeller reel rotatably carried by said frame to extend transversely thereof and having only one pair of diametrically opposed picker arm assemblies pivotally mounted thereon and movable in a circular path each assembly being provided with torsion spring means normally urging the picker arms thereof to a radially disposed position; variable speed motor drive means carried by the frame and connected to the impeller reel for rotating said reel at said high speed independently of the speed of movement of the frame over the ground and with a peripheral speed sufficient to strike the stones and impel the stones rearwardly of the frame, said reel moving the diametrically opposed picker arm assembly out of the path of the stones impelled by the other picker arm assembly, whereby unobstructed passage of the stones to the stone-receiving box is provided, said torsion springs yielding under abnormal loads to permit the picker arms to rock and pass immovable obstructions; a stone box on said frame in front of said impeller; and a substantially semicylindrical stone guiding means disposed behind the impeller and in spaced relation to the impeller for receiving stones thrown by said impeller and for deflecting said stones into said stone box upwardly and forwardly, said stone guide means comprising a plurality of transversely spaced rake bars permitting dirt and extraneous material to pass therebetween and a transversely extending beveled edged continuous rake blade connected to the lower ends of the rake bars adjacent the lowermost portion of the reel to move over the ground and prevent the rake bars from digging into the ground, the rake bars and the picker arms of one picker assembly and the spaces between the rake bars and the picker arms of the other picker assembly being in line.

2. A stone picker comprising a frame having a forward and rear end and wheels movable over the ground; a high-speed stone impeller means including a reel rotatably carried by said frame and having only one pair of projecting, diametrically opposed picker arm assemblies mounted thereon for movement in a circular path; stone-guiding means disposed behind the impeller means and having at least substantially semicylindrical guide members extending from adjacent the lowermost portion of the reel to a point over the reel and in spaced relation thereto; and a stone-receiving box located in front of the reel, said impeller means throwing the stones rearwardly against said stone-guiding means with a force sufficient to cause the stones to be deflected by said stone-guiding means upwardly and forwardly over the reel and into the stone box, said reel moving the diametrically opposed picker arm assembly out of the path of the stones impelled by the other picker arm assembly, whereby unobstructed passage of the stones to the stone-receiving box is provided.

3. The invention as defined in claim 2 wherein drive means is connected to said stone impeller means to rotate the same at a high speed independently of the speed of movement of the frame over the ground.

4. The invention as defined in claim 2 wherein said stone-guiding means comprises a plurality of transversely spaced rake bars permitting dirt and extraneous material to pass therebetween and a transversely extending beveled edged continuous rake blade connected to the lower ends of the rake bars to move over the ground and prevent the rake bars from digging into the ground.

5. The invention as defined in claim 2 wherein each picker arm assembly is provided with torsion spring means normally urging the picker arms thereof to radially disposed position, said torsion springs yielding under abnormal loads to permit the picker arms to rock and pass immovable objects.

References Cited in the file of this patent

UNITED STATES PATENTS

| Number | Name | Date |
|---|---|---|
| 1,126,695 | Bray | Feb. 2, 1915 |
| 1,381,540 | Carr | June 14, 1921 |
| 2,213,370 | Reiter | Sept. 3, 1940 |
| 2,362,402 | Reiter | Nov. 7, 1944 |
| 2,519,136 | Jochim | Aug. 15, 1950 |